Figure 3:
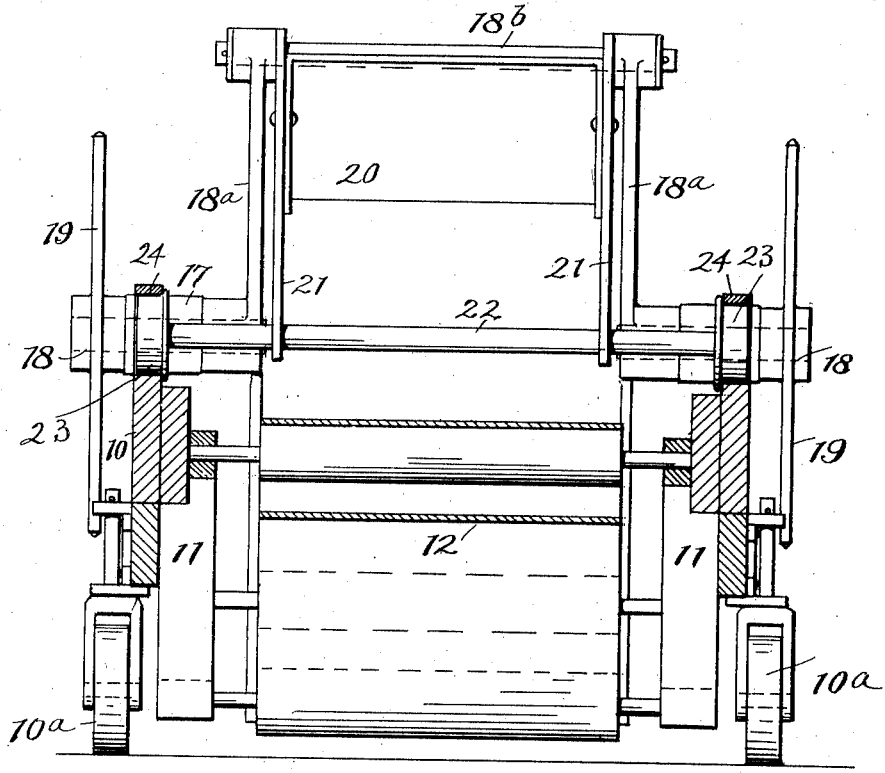

F. BILLINGS.
LOADING MACHINE.
APPLICATION FILED AUG. 24, 1916.
1,349,749.
Patented Aug. 17, 1920.
4 SHEETS—SHEET 1.
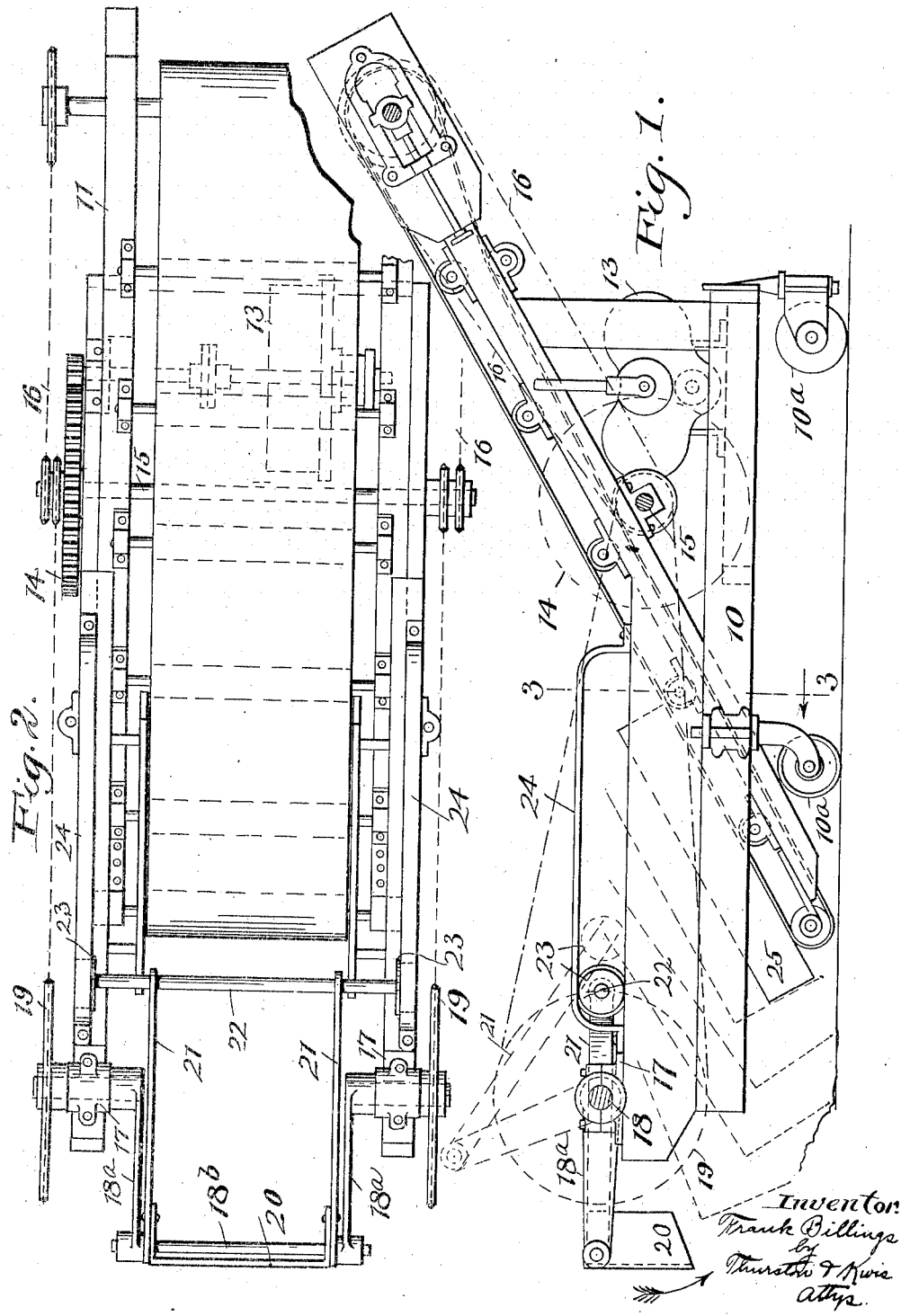

F. BILLINGS.
LOADING MACHINE.
APPLICATION FILED AUG. 24, 1916.

1,349,749.

Patented Aug. 17, 1920.
4 SHEETS—SHEET 2.

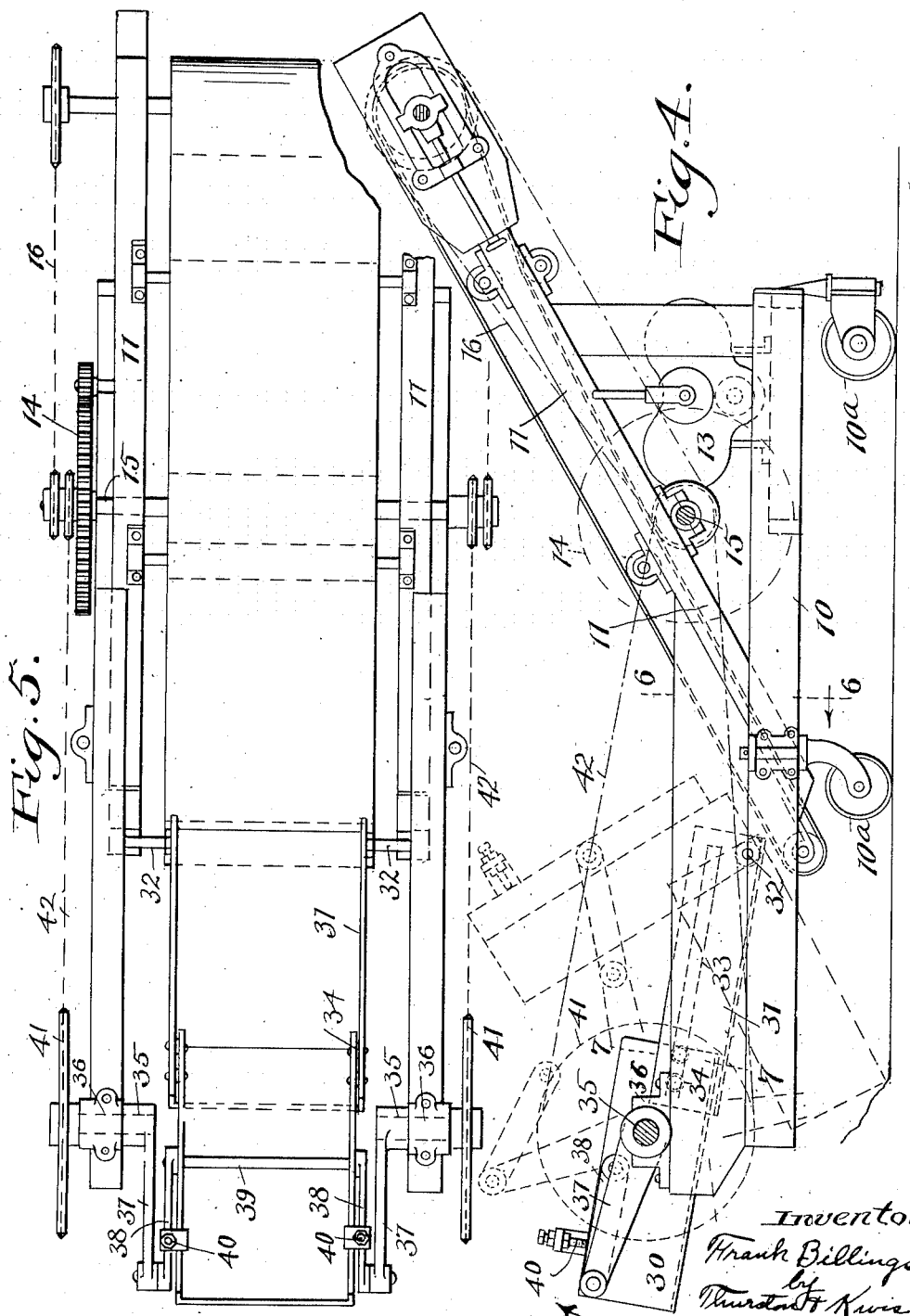

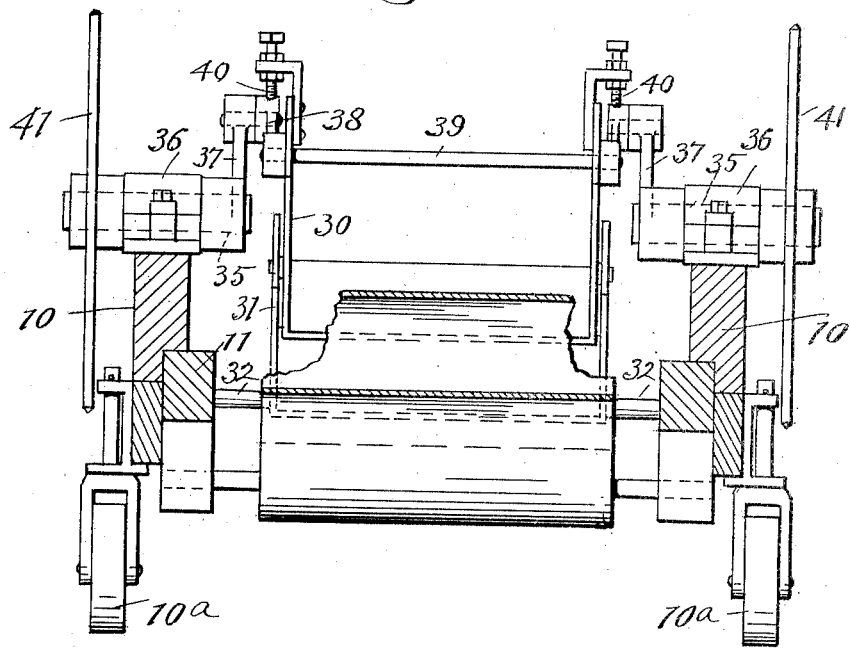
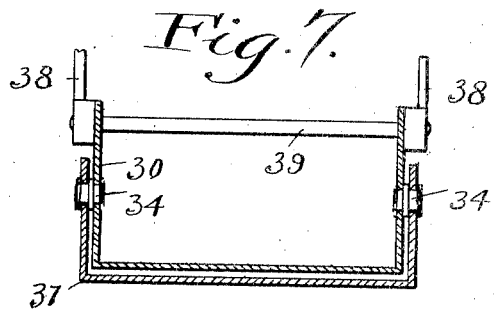

UNITED STATES PATENT OFFICE.

FRANK BILLINGS, OF CLEVELAND, OHIO.

LOADING-MACHINE.

1,349,749.     Specification of Letters Patent.      Patented Aug. 17, 1920.

Application filed August 24, 1916. Serial No. 116,588.

*To all whom it may concern:*

Be it known that I, FRANK BILLINGS, a citizen of the United States, residing at Cleveland, in the county of Cuyahoga and State of Ohio, have invented a certain new and useful Improvement in Loading-Machines, of which the following is a full, clear, and exact description.

This invention relates to loading machines adapted especially for use in mines, and has for its chief object the provision of a small and light but efficient machine adapted particularly to gather up and load loosened material or ore in confined spaces.

In my prior Patent No. 1,095,786, issued May 5, 1914, I have disclosed a loading machine which has proven in practice to be very efficient, especially where there is considerable space in which the movable ram may operate. In this machine there is a frame, and a conveyer, and superposed over the conveyer is a turn-table carrying a cradle which receives a reciprocating ram designed to move inwardly and outwardly so as to scrape the material up onto the conveyer, and to reach out in any direction to which the cradle and turn-table may be turned. This machine or rather the hoe on the movable ram has a considerable range of movement, so that a considerable quantity of material can be moved in and up onto the conveyer, and therefore a considerable space cleaned up, without advancing the machine as a whole.

The present machine instead of being heavy and instead of having a material moving member which has an extensive range of movement, is made light so that it can be readily and quickly moved about or positioned both at its front end with respect to the material to be loaded, and at the rear end with reference to the car which is to receive the material. At the front end of this machine there is provided a material moving member either in the form of a hoe or shovel, which scrapes or scoops up the material and deposits it on the conveyer, and while the working member or material moving member has a relatively small range of working movement, considerable material can be handled in a short time, because of the compactness, lightness, and portability of the outfit as a whole, the latter features enabling the machine to be kept right up to the work always in reach of the material to be loaded.

My invention herein may be briefly described as consisting in certain novel details of construction and combinations and arrangements of parts which will be described in the specification and set forth in the appended claims.

In the accompanying sheets of drawings wherein I have shown two forms of my invention, Figure 1 is a side view of the machine having a material moving member in the form of a crank operated scraping hoe; Fig. 2 is a plan view of the same; Fig. 3 is a transverse sectional view substantially along the line 3—3 of Fig. 1; Fig. 4 is a side view showing a modification wherein the material moving member is in the form of a telescoping shovel or bucket which in one continuous movement scoops up the material and then is tilted so as to discharge the same onto the conveyer belt; Fig. 5 is a top plan view of the same; Fig. 6 is a transverse sectional view substantially along the line 6—6 of Fig. 4 looking in the direction indicated by the arrow; Fig. 7 is a sectional view substantially along the line 7—7 of Fig. 4.

Referring now to the drawings, and first to Figs. 1 to 3, 10 represents the main frame of the machine which as here shown, is substantially horizontal and rectangular in contour. This frame and all the parts carried by it are supported on wheels 10$^a$, which are designed to run upon the ground or mine floor, and do not necessitate the use of tracks. These wheels are preferably all swiveled on the frame in such a way that they may be turned in any direction so as to permit the front or rear ends of the machine or the machine as a whole to be moved in any direction or to any desired position. In this case I have not shown the wheels driven by power, but they may be power driven if desired, the present machine being sufficiently light in weight that it can be moved about by a crow-bar, for example, in the hands of one of the operators, and if it is necessary to move the machine a considerable distance from one part of the mine to another this can be done by a suitable tractor.

Supported by the frame 10 is an inclined conveyer frame 11 provided with a suitable material moving conveyer proper preferably in the form of an endless belt 12. This belt, which travels about suitable rollers carried by the frame 11, is driven from a motor 13 which may be and preferably is an air motor. The motor drives a gear, shown conventionally at 14, this gear being mounted on a shaft 15 from which the conveyer is driven by chain and sprocket gearing, designated as a whole by the reference character 16.

At the extreme forward part of the frame 10 and mounted in bearings 17 is a crank shaft 18 provided at its ends with sprocket wheels 19 driven by a sprocket chain from the motor driven shaft 15. Connected between the throws or crank arms $18^a$ of the crank shaft 18 loosely mounted on the crank portion $18^b$ is a hoe 20 which is U-shaped, and which is caused to constantly assume such positions as the crank is rotated and to have a path of movement such that at every revolution of the crank, the hoe is lowered into the material and thence scrapes the material back onto the conveyer belt 12. For the purpose of causing the hoe to assume the desired positions as it passes through its cycle of movement the hoe is rigidly connected to a pair of arms 21 which may be and preferably are swiveled on the crank $18^b$ which arms are at their rear ends connected to a cross shaft 22 provided at its ends with rollers or guide wheels 23, which travel in a pair of trackways or guides 24 which are secured on the upper side members of the frame 10 just at the rear of the bearings 17 in which the crank shaft is mounted. As the crank shaft rotates these rollers travel back and forth in the grooves or slots of the guides, and they hold the hoe always in such positions that when the crank is swinging downward the hoe is substantially vertical, and will sink into the loosened material, and thence as the crank shaft continues its rotation this material is very effectively scraped rearward; as it approaches the elevating belt the angle of the hoe is gradually changed so that the material is effectively scraped onto the conveyer belt. It might be here stated that the lower front part of the elevator frame is preferably provided with side boards 25 forming a species of hopper to keep the material from falling sidewise off the belt when the material is scraped rearwardly onto the belt by the hoe.

In Figs. 4 to 7 I have shown a modification wherein the material moving member is in the form of a telescoping bucket which, while moving forward scoops up the load and on its rearward and upward movement carries the material back onto the conveyer belt. In this case the frame 10 and conveyer frame 11, are substantially the same as in the first instance although the conveyer frame does not extend downwardly as low as does the frame in the construction first described. The fact that the lower end of the conveyer frame may be kept at a greater distance from the ground than in the first construction is an important advantage. In the construction now being considered the frame 10 and other parts supported thereby are in turn supported by ground wheels like those first described.

In this construction the material moving member is in the form of a bucket or shovel which is given a reverse movement to that shown in the construction first described, and in its downward and forward movement picks up the load, and thence when elevated and swung rearwardly is tilted so as to discharge the material onto the conveyer. This bucket in this case consists of a digging and scooping member 30, which is substantially U-shaped in cross section, being open at its front and rear ends, and a second U-shaped member 31, the two parts 30 and 31 being telescopically arranged; that is to say, the member 30 is adapted to slide back and forth in the part 31. The rear part 31 is pivoted at 32 on the side members of the frame 10 and preferably it is provided along its side walls with slots 33 which are engaged by rollers or pins 34, on the front part 30.

This bucket is operated by mechanism including two short shafts 35 supported in bearings 36 at the front of the frame 10. These shafts are provided at their inner ends with crank arms 37, at the outer or free ends of which are pivotally supported links or arms 38 which are shorter than the crank arms, and are connected to a cross shaft 39 extending transversely through the upper part of the front bucket member 30 near the middle thereof. The bucket member 30 is provided with stop members 40, preferably in the form of adjustable screws which are designed to be engaged by the arms or links 38 as the crank arms reach a certain point in their upward travel or movement, so as to cause the bucket as a whole to be elevated and properly tilted. The arms 38 and bucket move relatively until the former engage the stops, after which and for a portion of the movement of the crank arms the arms 38 are held fixed by the stops and the crank arms alone move the bucket. Then when the crank arms reach a certain other position the arms 38 leave the stops and the bucket is tilted by the combined action of the arms 38 and crank arms.

The outer ends of the short shafts 36 which with the parts associated therewith constitute a crank shaft, are provided at their outer ends with sprocket wheels 41 which are driven from the motor driven shaft 15 by sprocket chains 42, this shaft being driven by a motor 13 as in the first instance.

The construction is such that as the crank arms are rotated in a clockwise direction, as viewed in Fig. 4, the front bucket member 30 is slid back and forth in the rear bucket member 31 which turns about the axis 32 and at each revolution the bucket member 30 is swung downwardly and forwardly so as to pick up a load of material, and is thence elevated and tilted so as to discharge the material onto the conveyer belt, the rear end of the bucket member 31 being always just above the forward end of the conveyer belt.

To explain the operation somewhat more in detail, as the crank arms swing downwardly and forwardly, the front end of bucket member 30 is down substantially to the level of the ground or surface upon which the ground wheels run, and then as the crank arms continue their rotation the bucket member 30 is moved forwardly and upwardly so as to pick up a load, this member at such time sliding outwardly through the bucket member 31. As the movement continues the bucket is elevated or tilted, the links or arms 38 engaging the stop member or members 40 so that said bucket will be caused to have a certain path of movement. As the crank arms 37 and links or arms 38 assume substantial alinement, the bucket is tilted to the extreme angle, and just as the crank arms and links 38 pass through the dead center position the bucket is given a quick rearward swing or tilt, which causes all the material which had not previously slid out of the bucket to be thrown onto the conveyer. The two members 30 and 31 may be regarded as a two-part telescopic bucket pivoted at one end, or they may be regarded as constituting a bucket and coöperating delivery chute with respect to which the bucket proper telescopes or slides, and viewing the construction from another angle, the rear part 31 may be regarded not only as a chute or delivery member for the front part or bucket proper, but it may be regarded as a combined delivery member and guide for the bucket. In its function as a guide it controls to an extent the position of the bucket proper at any given position or angle of the crank arms.

Having thus described my invention, what I claim is:

1. In a loading machine, a frame having a conveyer, a digging member having a blade for moving material onto the conveyer, a crank for actuating said member and connected thereto adjacent the blade, the said member being substantially horizontal when the crank is in its forward horizontal position, and the frame having a guide member with respect to which the rear part of said digging member has a straight line motion during the rotation of the crank.

2. In a loading machine, a frame having a conveyer, a digging member having a blade for moving material onto the conveyer, a crank for actuating said member and connected thereto adjacent the blade, the said member being substantially horizontal when the crank is in its forward horizontal position, and the frame having a guide member with respect to which the rear part of said digging member has a straight line motion during the rotation of the crank, the crank being located at the forward end of the frame, both the crank and the digging member projecting forwardly beyond the latter at the extreme forward stroke of the digging member.

3. In a loading machine, a frame having a conveyer for conveying material rearwardly relative to the same, means for moving the material onto the conveyer comprising a hoe, means for giving said hoe a digging and rearward scraping movement comprising a crank connected to the hoe, and a trackway with respect to which the rear part of the hoe has a sliding action as the crank is rotated, said trackway extending substantially horizontally rearwardly in substantially the plane of the axis of the crank.

4. In a loading machine, a frame having a conveyer for conveying material rearwardly through the same, mechanism for digging into and moving material rearwardly onto the conveyer, said mechanism comprising a blade, a crank supported on the frame and connected to said blade substantially in line with the digging edge thereof, and a rearwardly extending guide member guided on the frame and having a forward and rearward sliding movement relative thereto as the crank is rotated.

5. In a loading machine, a frame having a conveyer for conveying material rearwardly relative to the same, mechanism for digging into and scraping material rearwardly onto the conveyer, said mechanism comprising a blade, a crank connected to the blade, substantially in line with the digging edge thereof, said crank being mounted on the forward end of the frame, a guide member extending rearwardly from the blade, and guiding means on the frame extending substantially horizontally in line with the axis of the crank, said guide member having a straight line movement relative to the guiding means on the frame as the crank is rotated.

6. In a loading machine, a frame having a conveyer for conveying material rearwardly relative to the same, mechanism for digging into and scraping material rearwardly onto the conveyer, said mechanism comprising a digging and scraping blade, a crank mounted on the front end of the frame and having crank arms connected to the blade adjacent the digging edge thereof, said frame having substantially horizontal guide members substantially in line with the axis of the crank, arms projecting rearwardly from the blade and at their rear ends having means engaging said guide members and having a straight line movement relative thereto when the crank is rotated.

In testimony whereof, I hereunto affix my signature in the presence of two witnesses.

FRANK BILLINGS.

Witnesses:
   ROBERT P. GREENLEAF,
   FLORA McKENZIE.